United States Patent Office 3,020,198
Patented Feb. 6, 1962

3,020,198
CHLOROMETHYL THIONOPYROPHOSPHATE ESTERS AND THEIR USE AS PESTICIDES
Ralph B. Fearing, Hammond, Ind., Edward N. Walsh, Chicago Heights, Ill., and John G. Brady, Campbell, Calif., assignors to Stauffer Chemical Company, New York, N.Y., a corporation of Delaware
No Drawing. Filed Oct. 3, 1960, Ser. No. 59,815
15 Claims. (Cl. 167—22)

This invention is directed to a new group of chloromethyl thionopyrophosphate esters characterized by the general formula:

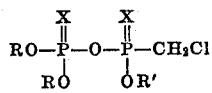

wherein R and R' are the same or different lower alkyl radicals having from one to six carbon atoms, and wherein one of the substituents represented by X and Y is sulfur and the other is oxygen.

We have discovered that the novel compounds of this invention are highly effective in controlling various macroscopic pest organisms such as lepidopterous insects, especially larval forms; larval and post embryonic forms of mites; and members of the more common insect orders, especially those of which the house fly, American roach, milkweed bug, and confused flour beetle are representative members. These compounds have also been found to exhibit a very low level of phytotoxicity making them suitable for agricultural use where the toxic material is often applied directly to growing plants or mixed into the soil around the roots of such plants.

The unsymmetrical chloromethyl thionopyrophosphate esters of this invention are prepared by reacting either (1) an O-(lower alkyl) chloromethylphosphonochloridothionate with an O,O-di(lower alkyl)acid phosphate, or (2) an O-(lower alkyl) chloromethylphosphonochloridate with an O,O-di(lower alkyl) acid thiophosphate. Both reactions are exothermic and require the presence of a tertiary organic base such as pyridine or triethylamine. Reaction between the chloromethylphosphonochloridothionates and the acid phosphates usually must be initiated and maintained at a temperature of at least about 30° C., preferably 35° C. to 50° C., while the reaction between the chloromethylphosphonochloridates and the acid thiophosphates will proceed at temperatures as low as about 0° C. To prevent side reactions in both cases the reaction temperature must be maintained below about 80° C., but it is preferable to limit this upper temperature to 50° C. The chloromethyl thionopyrophosphate esters of this invention are stable at fairly high temperatures and may be isolated from their reaction mixtures by conventional recovery techniques, including molecular distillation where high purity is desired. Except for the chloromethylphosphonochloridothionates, all of the reactants are well known in the art. Chloromethylphosphonochloridothionates may be prepared by reacting $ClCH_2P(S)Cl_2$ with the desired lower alkyl alcohol in solution with triethylamine and benzene.

The following examples serve to illustrate our findings but they are not intended to serve as a limitation to the broader aspects of the invention.

EXAMPLE I

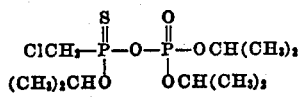

The O-isopropyl chloromethylphosphonochloridothionate intermediate was first prepared. A 367 gm. portion of $ClCH_2P(S)Cl_2$ was mixed with 500 ml. benzene and then slowly treated with a mixture of 125 gms. isopropanol (2.1 mols) and 190 gms. triethylamine (1.85 mols) for 45 minutes at a temperature of 35° C. After standing overnight the mixture was filtered and distilled under a mild vacuum to remove benzene. Further distillation was accomplished in a two foot Vigreux column with the O-isopropyl chloromethylphosphonochloridothionate fraction being taken off at between 49° C. and 68° C. at 2 mm. Hg. This material weighed 150.4 gms. and had an index of refraction $N_D^{25}=1.5078$.

To a mixture of 36.4 gms. of O,O-diisopropyl acid phosphate and 41.4 gms. of the O-isopropyl chloromethylphosphonochloridothionate produced as shown above, was added, at 35° C., 21 gms. of triethylamine. After addition of 1 cc. of pyridine the mixture was allowed to stand overnight. Filtration and washing of the solid with benzene gave, upon stabilization to 47° C. at 1 mm. Hg, a 75% yield of crude product still containing 0.9% N. Washing this with icewater and then with soda ash in icewater removed the free acid contained as an impurity and gave a product which analysis showed to be O-isopropyl-O-(diisopropyl phosphoro) chloromethylphosphonothioate. The hydrolysis rate of this composition was found to be about 5% per day in water suspension at room temperature.

EXAMPLE II

In a second preparation of the compound of Example I, a pyridine-O,O-diisopropyl acid phosphate mixture (a liquid salt) was added to a 50% solution of the O-isopropyl chloromethylphosphonochloridothionate in benzene at 35° C. and allowed to stand for three days. After two extra hours of heating to 40° C. the mixture was washed with an equal volume of icewater, then with two smaller icewater washings, and finally with one washing with bicarbonate and two with icewater. Counter-extractions with benzene indicated that the product loss by solubility in the icewater was negligible. The yield after stabilization to 60° C. at high vacuum was 86% and the density and index of refraction were 1.162 (at 19° C.) and 1.4627 (at 25° C.), respectively.

Molecular distillation gave a 90% recovery of the pure O-isopropyl-O-(diisopropyl phosphoro) chloromethylphosphonothioate with an index of refraction $$N_D^{25}=1.4612$$

The analysis showed 8.9% S (theory 9.1%) and 10.4% Cl (theory 10.1%). Again the product was shown to hydrolyze in water suspensions at the rate of about 5% per day at room temperature.

EXAMPLE III

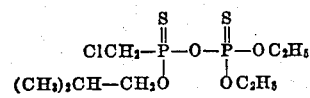

The O-isobutyl chloromethylphosphonochloridothionate intermediate was first prepared by a method similar to that shown in Example I for its homolog.

This intermediate and $(C_2H_5O)_2P(O)OH$ were mixed in stoichiometric proportions (0.2 mol of each) and treated slowly at 20°–40° C. with pyridine. After 30 minutes of heating to 50° C., and two days' standing, the pyridine hydrochloride was filtered off and washed with $CCl_4$. It was found to be slightly too heavy, being contaminated with about 30% of the acid phosphate salt. The filtered and stabilized liquid products, however, showed a 78% yield of O-isobutyl-O-(diethyl phosphoro) chloromethylphosphonothioate which analyzed 18.3% P (theory 18.3%), 9.3% S (theory 9.45%), and 10.3% Cl (theory 10.5%).

EXAMPLE IV

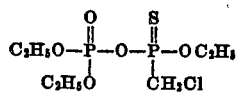

A 17.46 gm. sample of O-ethyl chloromethylphosphonochloridothionate was placed in a flask and treated dropwise with a mixture of 14.7 gms. of O-O-diethyl acid phosphate (about 5% excess) and 7.8 gms. pyridine (also a slight excess). The temperature rose to 40° C. and was maintained at this level for one hour after the addition was completed. The product was washed three times with icewater then stabilized to 60° C. at a high vacuum. A yield of 22.5 grms. (80% theory) of O-ethyl-O-(diethyl phosphoro) chloromethylphosphonothioate was obtained. The product showed an index of refraction $N_D^{25}=1.4680$ with an analysis of 20.0% P (theory 20.0%) and 10.6% S (theory 10.3%).

EXAMPLE V

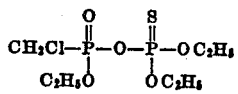

A 35.5 gm. sample of O-methyl chloromethylphosphonochloridate was placed in a flask and treated dropwise with 97 cc. of a solution of pyridine and O,O-diethyl acid thiophosphate in dioxane (slight excess over the 0.2 mol of thiophosphate required). During the addition, the mixture was maintained at a temperature below 31° C. by a water bath, and thereafter stirred for one hour at room temperature. The reaction mixture was freed of dioxane to a temperature of 70° C. at 20 mm. Hg. It then weighed 113 gms. After an icewater wash (equal volumes) the weight was found to be 43.7 gms. After two more washes (half volume) the O-ethyl-O-(O,O-diethyl phosphorothio) chloromethylphosphonate product (upon stabilizing the mixture to 70° C. at 2 mm. Hg) was found to be 26.2 gms.

The compounds of this invention are predominantly colorless, low viscosity liquids. For determining pesticidal activity these liquids are usually mixed with a suitable solvent, such as acetone to form solutions capable of being sprayed from an ordinary De Vilbiss hand atomizer. To adjust the mixture to the desired concentration of active material, "wet water" is added. Wet water is composed of the following ingredients in the stated proportions:

Vatsol (sulfonate-type wetting agent) _____grams__ 2.5
Methocel (methyl cellulose) _____do____ 1.0
Water _____liters__ 20

This mixture allows for better wetting and higher retention of the toxicant solution on the insect cuticle than could be obtained with water alone.

As a representative species, the two-spotted mite, *Tetraanychus telarius*, was selected for tests to determine miticidal activity. Young Pinto bean plants in the primary leaf stage were used as the host plant for the mites. These bean plants were infested with several hundred two-spotted mites. Infested plants were sprayed to runoff with selected concentrations of toxicant in the test solution described above, and then transferred to a greenhouse and held for fourteen days. The fourteen day reading is necessary for evaluating ovicidal activity. The results are expressed in terms of percent mortality of post embryonic and embryonic forms. The following table shows the results of such tests with the compounds prepared in the foregoing examples:

Table I
PERCENT MORTALITY OF TWO-SPOTTED MITES—
*TETRANYCHUS TELARIUS*

| Sample | Concentration of Active Material, percent | Post Embryonic Kill, 14 Days, percent | Egg Kill, 14 Days percent |
|---|---|---|---|
| Compound of Example 4 | 0.25 | 100 | 70 |
|  | 0.06 | 50 | 0 |
| Compound of Example 5 | 0.25 | 100 | 100 |

No phytotoxicity was observed with the bean plants in the above tests.

Species of several common insect orders were chosen for screening the insecticidal activity of the compounds of this invention. Test insects were usually caged in cardboard mailing tubes 3⅛" in diameter and 2⅝" tall with cellophane bottoms and screened tops. For *T. confusum*, glass petri dishes were used. Depending upon the species, ten to twenty-five insects were placed in each cage. With each species, extending *T. confusum*, the cages were supplied with food and water. These tests were used to indicate both stomach and contact activity, in the case of confused flour beetles fumigant toxicity was also evaluated by the above outlined procedure. The stomach action is achieved through the food and water which are sprayed along with the insects. The test insects are sprayed with a solution of the active compounds of this invention. Seventy-two hour mortality readings were reported in the following table:

Table II
MORTALITY OF REPRESENTATIVE SPECIES OF COMMON INSECT ORDERS

| Sample | Toxicant Concentration in Spray Solution, percent | *M. domestica*, percent Kill | *P. americana*, percent Kill | *O. fasciatus*, percent Kill | *T. confusum*, percent Kill |
|---|---|---|---|---|---|
| Compound of Example 1 | 0.5 | 100 |  | 100 | 100 |
| Do | 0.12 | 100 | 100 | 70 | 100 |
| Compound of Example 3 | 0.5 | 100 | 100 | 100 | 100 |
| Do | 0.06 | 100 | 30 | 80 | 100 |
| Do | 0.03 | 100 | 10 | 20 |  |
| Compound of Example 4 | 0.25 | 100 | 100 | 100 |  |
| Compound of Example 5 | 0.5 | 88 | 40 | 10 | 0 |

Some of the compounds of this invention were evaluated on the salt-marsh caterpillar, *Estigmene acrea*, a representative species of lepidopterous insect. The order to which the salt-marsh caterpillar belongs comprises a large number of economically important plant pests. In these tests contact and stomach action of the compounds were determined.

A solution of the test compound, mixed with the desired amount of wet water, was prepared. Dock leaves approximately five inches long were dipped into this solution for ten seconds and then allowed to dry. A filter paper disk was placed in a one pint food container and moistened with 1 ml. of water. The dried dock leaves were placed in the container together with five third instar salt-marsh larvae. A petri dish cover was used for convenient observation. The test is held for 48 hours. After 24 hours a fresh undipped dock leaf was inserted in the cage. Mortality readings were taken at 24 and 48 hours. Forty-eight hour readings using this leaf-dip bioassay method to determine the activity of O-isobutyl-O-(diethyl phosphoro) chloromethylphosphonothioate on the salt-marsh caterpillar showed 100% kill at both 0.10 and 0.05% concentrations of the toxicant.

As used herein the term "pesticide" is intended to define toxic activity with various species of macroscopic pest organisms, but particularly with insects such as the house fly, American roach, milkweed bug, and confused flour beetle, and mites and lepidopterous larvae. It will be apparent to one skilled in the art that the effects demonstrated on the selected species are highly indicative of toxic activity in the orders represented by such species as well as various other orders not specifically shown.

As pesticides the compounds of this invention are normally mixed with suitable adjuvants, solvents, diluents, fillers, and dusts to which are often added wetting, dispersing and emulsifying agents. However, for special applications the toxic material may be used in its pure undiluted form.

The foregoing detailed description has been given for clearness of understanding only, and no unnecessary limitations should be understood therefrom, as modifications will be obvious to those skilled in the art.

What we claim is:

1. A compound represented by the general formula:

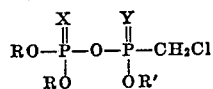

wherein R and R' are lower alkyl radicals having from one to six carbon atoms and wherein one of the substituents represented by X and Y is sulfur and the other is oxygen.

2. The compound O-isopropyl-O-(diisopropyl phosphoro) chloromethylphosphonothioate.

3. The compound O-isobutyl-O-(diethyl phosphoro) chloromethylphosphonothioate.

4. The compound O-ethyl-O-(diethyl phosphoro) chloromethylphosphonothioate.

5. The compound O-ethyl-O-(O,O diethyl phosphorothio) chloromethylphosphonate.

6. A method of killing pests which comprises contacting the pests with a pesticidal amount of at least one compound represented by the general formula:

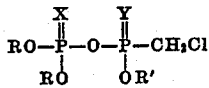

wherein R and R' are lower alkyl radicals having from one to six carbon atoms and wherein one of the substituents represented by X and Y is sulfur and the other is oxygen.

7. The method as set forth in claim 6 wherein the said compound is O-isopropyl-O-(diisopropyl phosphoro) chloromethylphosphonothioate.

8. The method as set forth in claim 6 wherein the said compound is O-isobutyl-O-(diethyl phosphoro) chloromethylphosphonothioate.

9. The method as set forth in claim 6 wherein the said compound is O-ethyl-O-(diethyl phosphoro) chloromethylphosphonothioate.

10. The method as set forth in claim 6 wherein the said compound is O-ethyl-O-(O,O diethyl phosphorothio) chloromethylphosphonate.

11. A method for producing a compound of the formula:

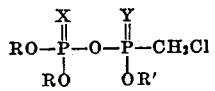

wherein R and R' are lower alkyl radicals having from one to six carbon atoms and wherein one of the substituents represented by X and Y is sulfur and the other is oxygen which comprises reacting at a temperature sufficient to maintain reaction but below the point where side reactions predominate a compound of the formula $(RO)_2P(X)OH$ with a compound of the formula:

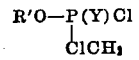

in the presence of a tertiary organic base.

12. A method of producing O-(lower alkyl)-O-[di-(lower alkyl) phosphoro] chloromethylphosphonothioate which comprises reacting O-(lower alkyl) chloromethylphosphonothioic chloride with O,O-di(lower alkyl) acid phosphate at a temperature above about 30° C. but below about 80° C. and in the presence of a tertiary organic base.

13. The method set forth in claim 12 wherein the reaction temperature is maintained within the range of 35° C. to 50° C.

14. A method of producing O-(lower alkyl)-O-[O,O-di-(lower alkyl) phosphorothio] chloromethylphosphonate which comprises reacting O-(lower alkyl) chloromethylphosphonothioic chloride with O,O-di(lower alkyl) acid thiophosphate at a temperature above about 0° C. but below about 80° C. and in the presence of a tertiary organic base.

15. All the features of novelty either shown or described taken either singly or in their possible combinations.

No references cited.

UNITED STATES PATENT OFFICE
CERTIFICATION OF CORRECTION

Patent No. 3,020,198                  February 6, 1962

Ralph B. Fearing et al.

It is hereby certified that error appears in the above numbered patent requiring correction and that the said Letters Patent should read as corrected below.

Column 1, lines 14 to 18, the formula should appear as shown below instead of as in the patent:

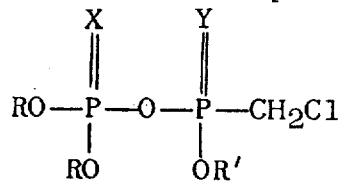

Column 2, lines 59 to 62, EXAMPLE III, the formula should appear as shown below instead of as in the patent:

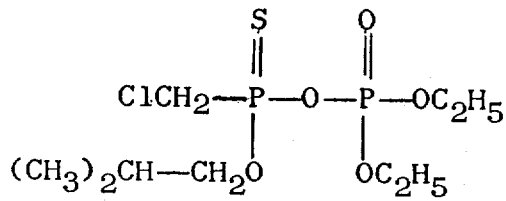

Column 6, line 46, beginning with "15. All the features" strike out all to and including "combinations.", in lines 47 and 48, same column, and insert instead the following:

15. The method set forth in claim 14 wherein the reaction temperature is maintained within the range of 30° C. to 50° C.

Signed and sealed this 29th day of May 1962.

(SEAL)
Attest:

ERNEST W. SWIDER
Attesting Officer

DAVID L. LADD
Commissioner of Patents